(12) United States Patent
Carrion et al.

(10) Patent No.: US 6,658,104 B1
(45) Date of Patent: Dec. 2, 2003

(54) METHOD AND APPARATUS FOR ALERTING USERS

(75) Inventors: Carlos F. Carrion, Rowlett, TX (US); Steven W. Craycraft, Plano, TX (US)

(73) Assignee: Nortel Networks Limited, St. Laurent (*) Notice: Subject to any disclaimer, the term of this patent is extended or adjusted under 35 U.S.C. 154(b) by 457 days.

(21) Appl. No.: 09/649,123

(22) Filed: Aug. 28, 2000

(51) Int. Cl.⁷ .............................................. H04M 11/04
(52) U.S. Cl. ............... 379/220.01; 379/48; 379/218.02; 379/43
(58) Field of Search ................ 379/220.01, 37–51, 379/106.01, 106.02, 218.02

(56) References Cited

U.S. PATENT DOCUMENTS

| | | | | |
|---|---|---|---|---|
| 3,865,985 A | * | 2/1975 | Stankus ........................ | 179/5 |
| 4,518,822 A | * | 5/1985 | Martinez ...................... | 179/2 |
| 4,651,339 A | * | 3/1987 | Gibbs ........................... | 379/42 |
| 5,029,290 A | * | 7/1991 | Parsons et al. ............... | 379/48 |
| 5,166,972 A | * | 11/1992 | Smith .......................... | 379/49 |
| 5,917,887 A | * | 6/1999 | Fesier et al. .................. | 379/48 |
| 5,937,036 A | * | 8/1999 | Dean et al. ................... | 379/44 |
| 6,002,748 A | * | 12/1999 | Leichner ...................... | 379/48 |
| 6,021,177 A | * | 2/2000 | Allport ........................ | 379/48 |
| 6,343,255 B1 | * | 1/2002 | Peek et al. .................... | 702/3 |
| 6,480,578 B1 | * | 11/2002 | Allport ........................ | 379/48 |
| 2002/0176545 A1 | * | 11/2002 | Schweitzer | |

* cited by examiner

Primary Examiner—William J Deane
(74) Attorney, Agent, or Firm—Trop, Pruner & Hu, P.C.

(57) ABSTRACT

A system includes a plurality of communication devices and a telephony exchange system. The telephony exchange system is adapted to communicate with the plurality of communication devices. The telephony exchange system comprises receiving an alert signal, identifying a plurality of users of the private telephony exchange system, and alerting the identified plurality of users in response to receiving the alert signal.

28 Claims, 5 Drawing Sheets

METHOD AND APPARATUS FOR ALERTING USERS

TECHNICAL FIELD

The invention relates generally to communication systems, and, more particularly, to a method and apparatus of alerting users of a communication system of an emergency.

BACKGROUND

Emergency warning systems are routinely deployed in buildings or various other types of premises to warn occupants of a potential danger. For example, fire alarm systems are typically deployed to alert the building occupants about the possibility of fire within the building. These emergency warning systems, when operating effectively, may save lives, or at least significantly reduce the probability of the building occupants encountering serious injury.

The effectiveness of these emergency systems, however, depends largely upon whether the warning message transmitted by the system is successfully received by the message recipient. The warning message may fail to reach its intended recipient for a variety of reasons. The emergency system, for example, may fail to deliver the warning message to a portion of a building because of mechanical or electrical faults. Accordingly, it is conceivable that occupants on one floor of the building may receive the warning message, while those on another floor may remain uninformed of the impending danger because of technical glitches, either in the building's wiring or with the emergency system itself.

Warning messages may also fail to reach the intended recipient if the building occupants are not in a suitable location to hear or see the warning message. That is, participants gathered in a large conference room, for example, may not be apprised of the warning message because of loud conversations or other distractions.

A need thus exists for an improved method and apparatus for delivering warning messages to those inside buildings or other structures.

SUMMARY

In general, according to one embodiment, a method comprises receiving an alert signal, identifying a plurality of users of a telephony exchange system, and informing the identified plurality of users in response to receiving the alert signal.

Some embodiments may have one or more of the following advantages. An independent (and perhaps a backup) emergency warning system may be deployed within a premises without the added expense of having to wire the entire premises or purchase an expensive backup emergency system. An efficient and effective method and telephony exchange system of notifying occupants of a building or premises of a possible emergency is provided. For example, occupants resident in a loud, crowded conference room or other public rooms may be efficiently and effectively informed of a possible emergency, even if the conventional emergency alarms are not audible in such areas. Accordingly, lives may be saved, or at least the probability of occupants encountering serious injury at the premises may be reduced.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
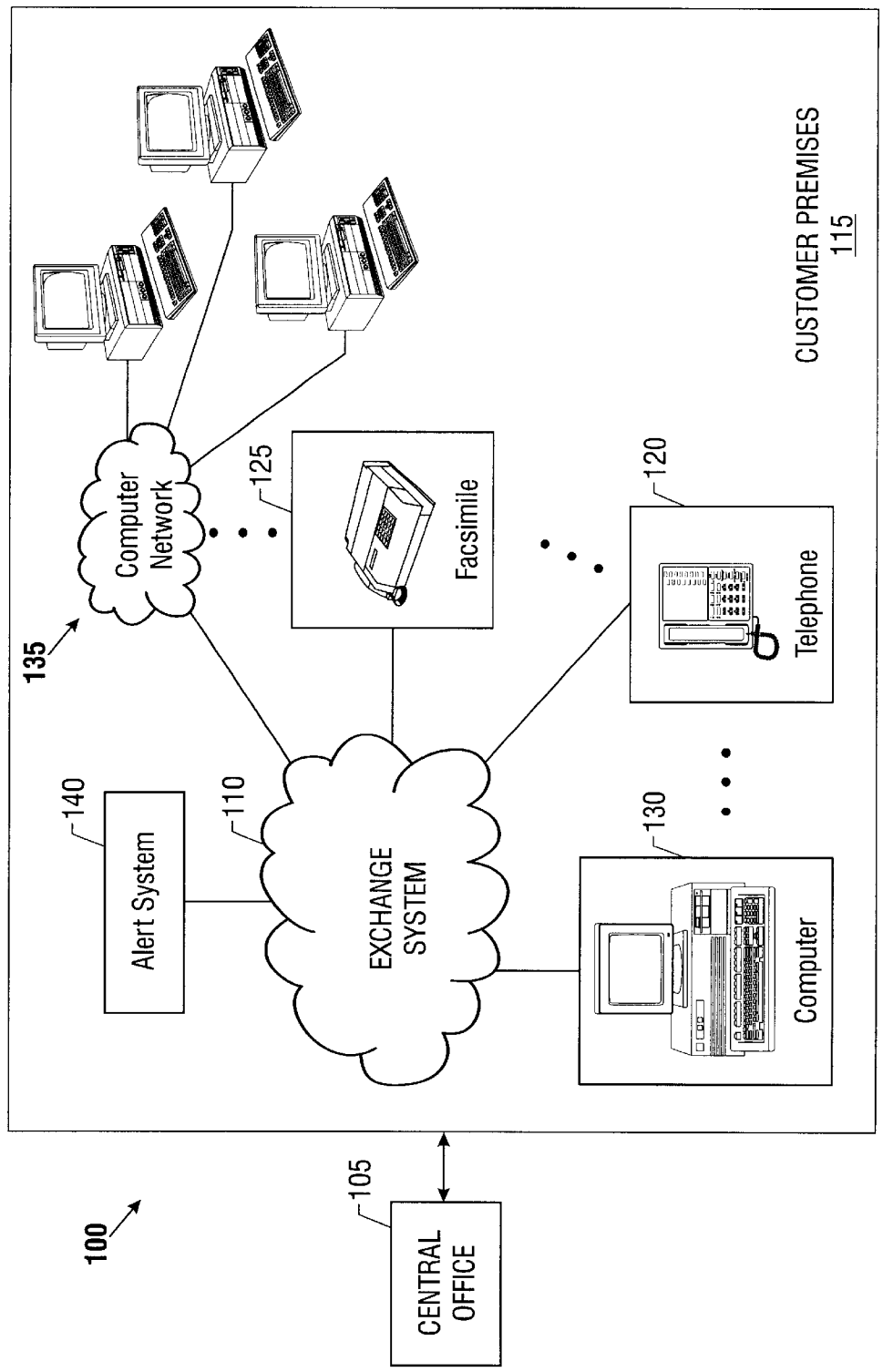
FIG. 1 is a block diagram of an embodiment of a communications system in accordance with the present invention.

Referring now to FIG. 1, one embodiment of a communications system 100, according to the present invention, is illustrated. FIG. 1 illustrates a central office 105 coupled to a telephony exchange system 110 located at customer premises 115. In one embodiment, the telephony exchange system 110 may be a private branch exchange (PBX) 220 system, key telephone system, Centrex system, or any one of a variety of switching systems capable of providing a telephone service to the customer premises 115. In an alternative embodiment, the telephony exchange system 110 may be a public switch, two or more private telephony exchange systems coupled by a public (public switched telephone network) line or a private line, or any other system capable of delivering messages to users inside the customer premises 115. The customer premises 115, in one embodiment may be a building or a plurality of buildings that are serviced by the telephony exchange system 110. The telephony exchange system 110 may offer a variety of services, such as voice mail, intercom, message waiting indication, and other features.

The telephony exchange system 110 is capable of communicating with a variety of communication devices, such as analog and digital telephones 120, facsimile devices 125, computers 130, and computer networks 135. The computer networks 135 may comprise private networks such as local area networks (LANs), wide area networks (WANs), or public networks such as the Internet. The computers may be any variety of computers that are capable of interfacing with the telephony exchange system 110 over a line.

In accordance with the present invention, the telephony exchange system 110 also interfaces to an alert system 140. In one embodiment, the alert system 140 may be an emergency system, such as a fire alarm system, heat sensing system, and smoke detection system, or a combination thereof. As is described in more detail below, the telephony exchange system 110 is capable of receiving an alert (e.g., emergency) signal from the alert system 140 and capable of relaying the alert signal to at least a portion of the communication devices (e.g., telephone 120, facsimile device 125, etc.) coupled to the telephony exchange system 110.

Figure 2:
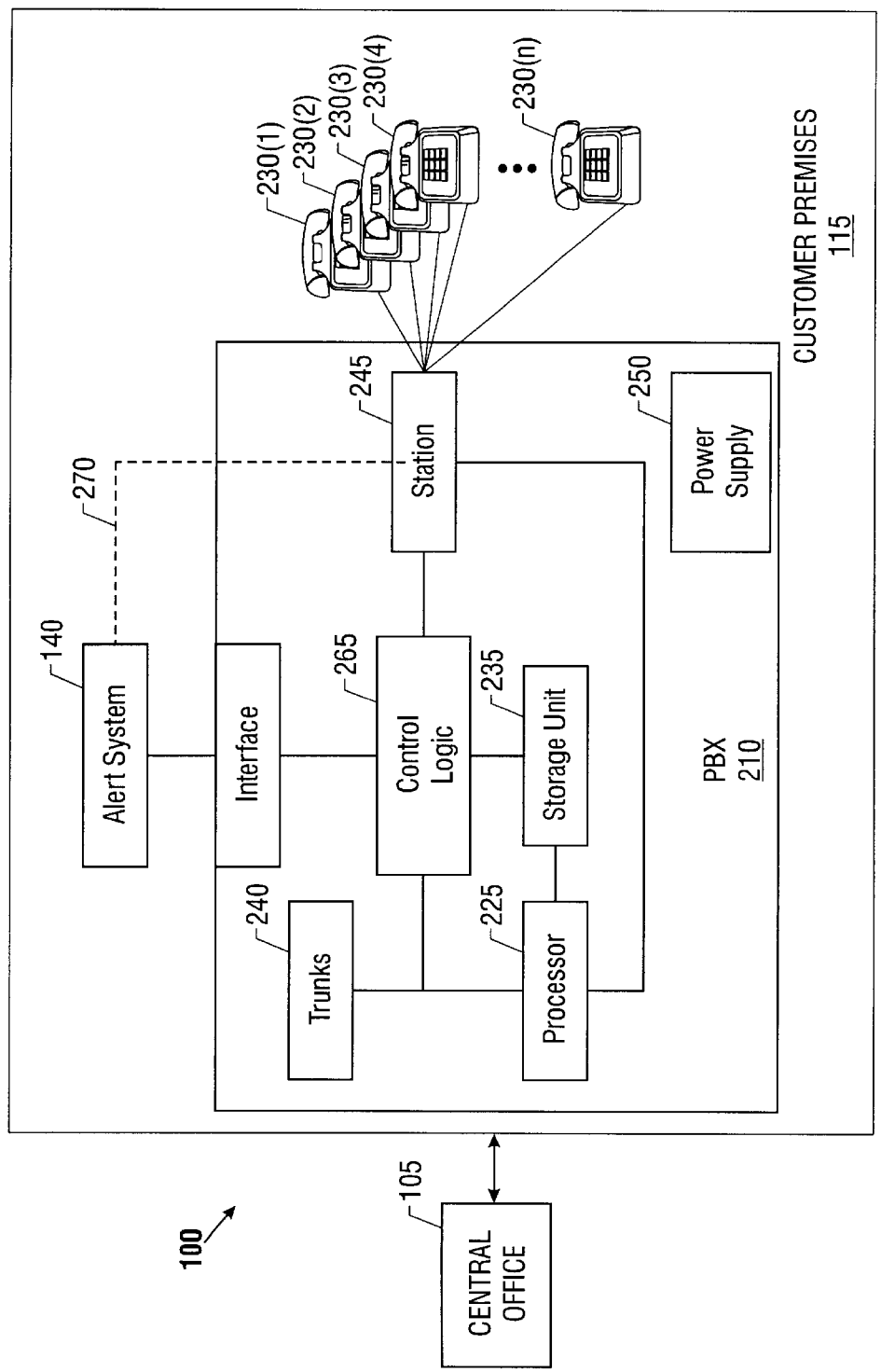
FIG. 2 is a block diagram of an alternative embodiment of a communications system in accordance with the present invention.

Referring now to FIG. 2, a specific embodiment of the telephony exchange system 110 is illustrated. In the illustrated embodiment of FIG. 2, the telephony exchange system 110 comprises a private branch exchange system 210. The PBX 210 may be one of a variety of known exchange systems, including but not limited to Private Automated Exchange (PABX), Computerized Branch Exchange (CBX), Digital Branch Exchange (DBX), or Integrated Branch Exchange (IBX). For ease and clarity, only the relevant functional blocks of the PBX 210 are shown. Those skilled in the art will appreciate that PBX 210 may employ additional logic for performing other features. Additionally, it should be appreciated that the functional blocks of the PBX 210 illustrated in FIG. 2 may be implemented in hardware, software, firmware, or a combination thereof.

The PBX 210, which comprises a processor 225, is capable of communicating with a plurality of telephones 230 (1-n), facsimile devices 125 (see FIG. 1), computers 130 (see FIG. 1), computer networks 135 (See FIG. 1), although in the illustrated embodiment the PBX 210 is shown to communicate with the plurality of telephones 230 (1-n). The PBX 210 may support a digital telephone, an analog telephone, or both.

The PBX 210 includes a storage unit 235 that may comprise one or more machine-readable storage media for storing data and instructions. The storage media may comprise different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions that make up the various software routine or modules in the private branch system 210 may be stored in respective storage devices. The instructions when executed by a respective control unit cause the private branch system 210 to perform programmed acts.

The instructions of the software routines or modules may be loaded or transported to the private branch system 210 in one of many different ways. For example, code segments including instructions stored on floppy disks, CD or DVD media, a hard disk, or transported through a network interface card, modem, or other interface device may be loaded into the private branch system 210 and executed as corresponding software routines or modules. In the loading process, the data signals that are embodied in carrier waves (transmitted over telephone lines, network lines, wireless links, cables, and the like) may communicate the code segments, including instructions, to the private branch system 210. Such carrier waves may be in the form of electrically, optical, acoustical, electromagnetic, or other types of signals.

The PBX 210 comprises trunks 240 for interfacing with the central office 105 and stations (sometimes referred to as "lines") 245 for interfacing with the communication devices (e.g., telephone, LAN, facsimile, and the like). The PBX 210 is a resource-sharing system that is capable of switching calls between users at the customer premises 115 while also allowing the users to share a certain number of external phone lines. A power supply 250 provides the necessary power to the PBX 210, and may also provide protection against power surges.

The PBX 210 comprises an interface 255 for interfacing to the alert system 140 over a communication link 260. As will be described in more detail below, the PBX 210 comprises control logic 265 for delivering a message to one or more users of the PBX 210 in response to receiving an alert signal from the alert system 140. Although not so limited, in the illustrated embodiment, the alert system 140 is a fire alarm system that is intended to warn occupants residing at the customer premises 115 of a possible fire. In alternative embodiments, the alert system 140 may be a smoke detection system, heat sensing system, carbon monoxide detection system, and the like. The alert signal from the alert system 140 may alternatively be delivered to the PBX 210 through one of the lines 245, as indicated by a dotted line 270.

The communication link 260 between the alert system 140 and the PBX 210 may either be a physical link or a wireless link. Examples of a physical link comprise a cable, a telephone wire, or any other wire-based link. For wireless links, the interface 255 may comprise at least a radio frequency (RF) receiver (not shown) for receiving alert signals from the alert system 140. The PBX 210 may also comprise an optional RF transmitter (not shown) for wireless communication with the alert system 140.

Figure 3:
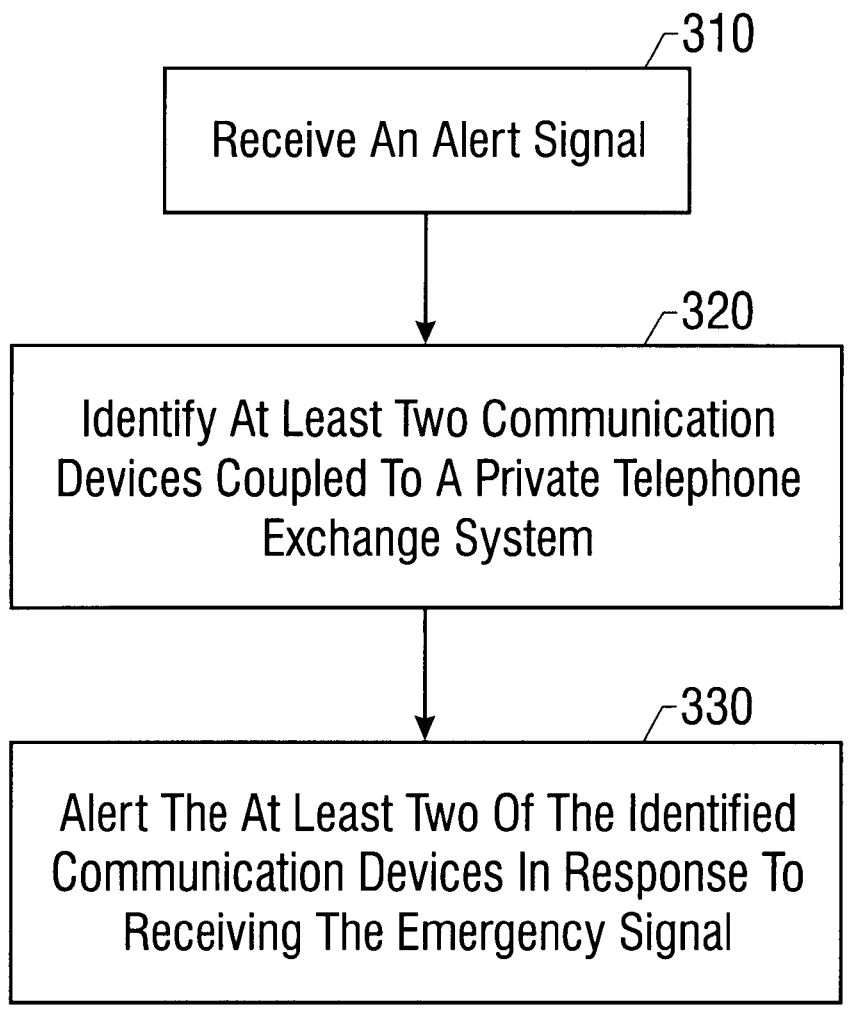
FIG. 3 illustrates an embodiment of a method that may be employed in the communication systems of FIGS. 1 and 2.

Referring now to FIG. 3, a method in accordance with the present invention is illustrated that may be employed by the PBX 210 of the communications system 100 of FIGS. 1 and 2. The method of FIG. 3 begins at block 310, where an alert signal is received from the alert system 140. In the illustrated embodiment, since the alert system 140 is a fire alarm system, the fire alarm system provides an alert signal to the PBX 210 to warn at least some of the occupants at the customer premises 115 of a potential fire hazard.

At block 320, the control logic 265 identifies at least two telephones 230 (1-n) that are coupled to the PBX 210. The identified telephones 230 (1-n) receive the fire alarm alert from the PBX 210. In one embodiment, all of the telephones 230 (1-n) that are coupled to the PBX 210 may be identified. In an alternative embodiment, the end user may specify selected telephones 230 (1-n) that receive an alert from the PBX 210. In one embodiment, the end user may identify telephones 230 (1-n) based on the location of the fire. That is, since it is possible that a common PBX 210 may service multiple buildings located within the customer premises 115, the end user may program the PBX 210 to identify only the users in a building (or buildings) that are endangered by the fire. The PBX 210 generally comprise the requisite information that is useful in identifying users based on their locations, such as the user's precise building or building floor.

Figure 4:
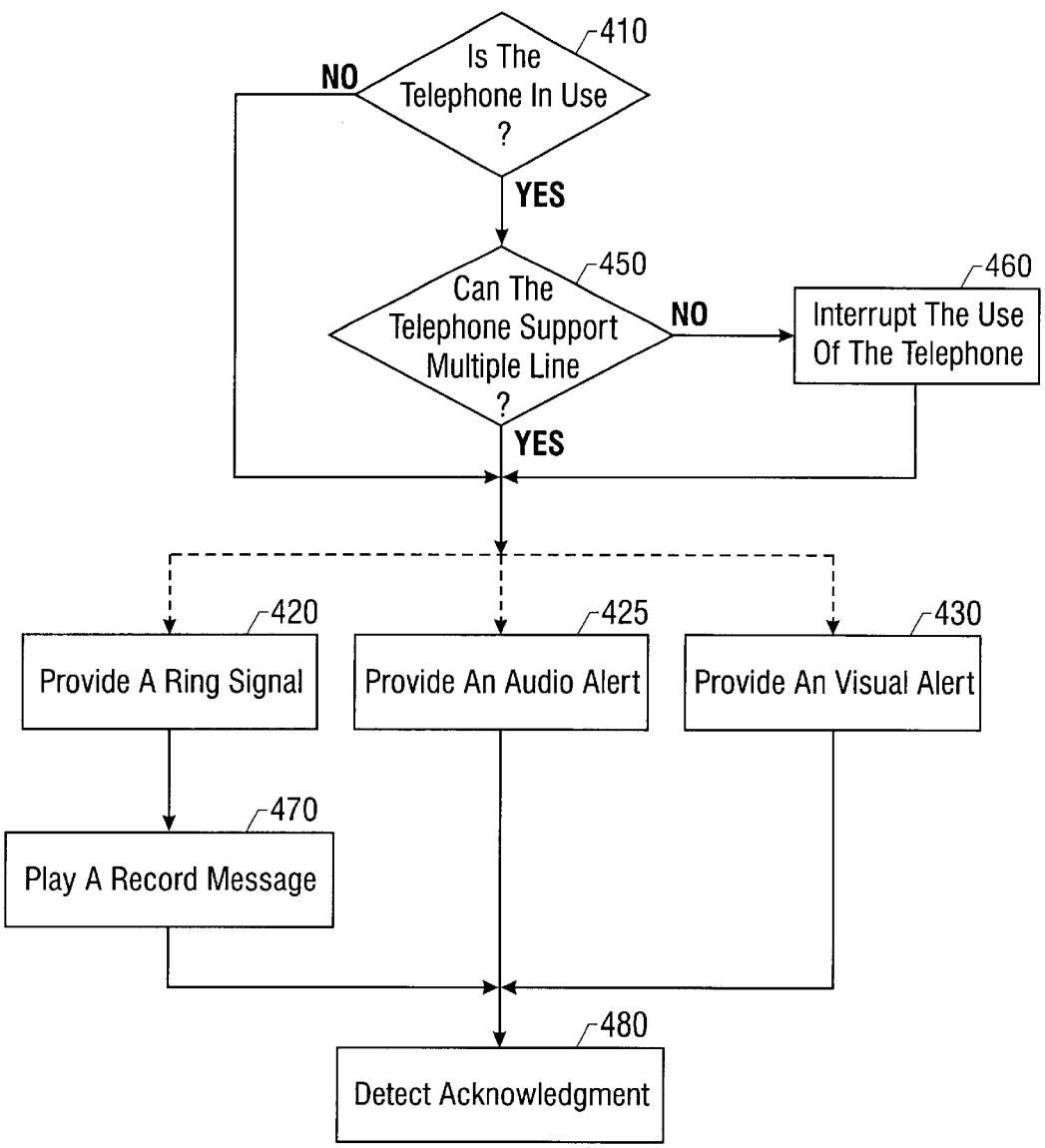
FIG. 4 depicts an embodiment of a flow diagram in accordance with the present invention that may be utilized to alert communication devices in the communications system of FIGS. 1 and 2.

At block 330, the PBX 210 alerts the at least two of the identified telephones 230 (1-n), in response to receiving the alert signal at the block 310. For illustrative purposes, it is herein assumed that, at the block 320, four telephones 230 (1–4) are selected to be notified of the fire alarm. Accordingly, in response to receiving the alert signal, at the block 330, the PBX 210 alerts the four telephones 230 (1–4). FIG. 4 illustrates one embodiment of the step at the block 330 of FIG. 3. Specifically, FIG. 4 illustrates exemplary methods of alerting the four telephones 230 (1–4) of the fire alarm.

The flow diagram of FIG. 4 begins at block 410, where the PBX 210 determines if each telephone of the four identified telephones 230 (1–4) is in use. Since the PBX 210 typically manages the calls to and from the telephones 230 (1–4), the PBX 210 can readily ascertain whether a particular telephone is in use. If none of the telephones 230 (1–4) are in use, then the PBX 210 provides at least one of a ringing, audio, or visual alert to the telephones 230 (1–4) at blocks 420, 425, 430, respectively. The audio signal may be in the form of distinct beeps, thereby drawing the attention of the user. The visual alert may be in the form of a text message, perhaps flashing on the screen of the telephones 230 (1–4), indicating to the user of a possible fire at the premises. In one embodiment, the end user may select the type of alert (e.g., audio, visual, ringing, etc.) that is transmitted to the telephones 230 (1–4).

In an alternative implementation, it may be possible to transmit the audio, visual, or ringing signal to the telephones 230 (1–4), regardless of whether the telephones 230 (1–4) are in use. For example, audio or visual alerts may be transmitted on the line in a similar manner to the way caller ID information is relayed on the telephone lines. Additionally, if the PBX 210 supports call waiting, an audio signal in the form of clicks, for example, may alert the user of an another incoming call.

At the block 410, if any of the four selected telephones 230 (1–4) is in use, then, at block 450, the PBX 210 determines if any of the four selected telephones 230 (1–4) is configured to support more than one line. If a particular telephone 230 (1–4) is capable of supporting more than one line, then the PBX 210 provides at least one of a ringing, audio, or visual alert to that telephone 230 (1–4) at the blocks 420, 425, 430, respectively, using the available line. The ringing signal may be provided to each telephone 230 (1–4) capable of supporting multiple lines on one of the alternate lines. If, however, a particular telephone 230 (1–4) is in use and is not configured to support more than one line, then, at block 460, the PBX 210 interrupts the use of that telephony 230 (1–4) to alert the user of the fire alarm. The user's telephone call may not be interrupted, however, if the call is placed to request emergency services (e.g., a call to a 911 number). The PBX 210 may be programmed to ascertain whether the user is engaged in a call with emergency personnel. In another embodiment, even if the user is on the telephone 230 (1–4) with an emergency personnel, the PBX 210 may nevertheless convey a visual or an audio alert to the telephone 230 (1–4) without interrupting the user's call.

At block 470, if a particular telephone 230 (1–4) is answered in response to the ringing signal, a pre-recorded message warning the user of the fire alarm may be played. At block 480, the PBX 210 detects the telephones 230 (1–4) that acknowledge receiving the alert transmitted by the PBX 210 at the block 330 (see FIG. 3). As is described in more detail below, tracking the acknowledgements from the users provides valuable data in approximating the number of occupants that may still be inside the premises 115. A telephone's transition from an on-hook state to an off-hook state in response to the ringing signal, for example, may be one form of an acknowledgement from the end user. Additionally, users that receive an audio or a visual alert may acknowledge receipt of the alert by either calling a designated telephone number, or, alternatively, by pressing a designated key on the telephone 230 (1–4) to indicate that the alert has in fact been received. The PBX 210 may monitor for a depressed key as a way to determine that the alert has reached its recipient.

Figure 5:
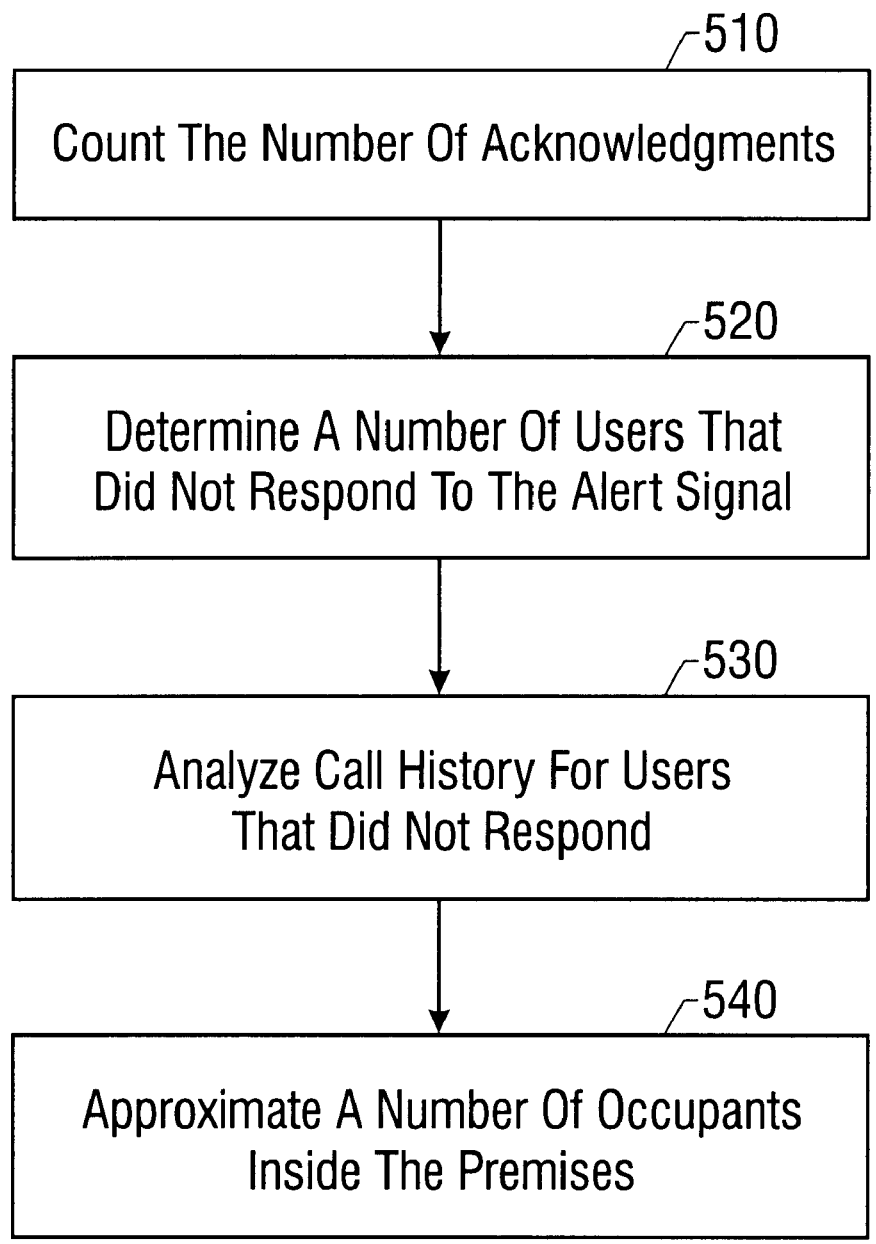
FIG. 5 illustrates an embodiment of a method that may be employed in the communication systems of FIGS. 1 and 2.

FIG. 5 illustrates a method that may be employed by the communication systems 100 of FIGS. 1 and 2 to approximate the number of occupants that may still be inside the premises. The method of FIG. 5 begins at block 510, where the control logic 265 (see FIG. 2) tabulates the number of acknowledgements received at the block 470 (see FIG. 4). At block 520, based on the received acknowledgements and the alerts transmitted at the block 330 (see FIG. 3), the control logic 265 determines a number of telephones 230 (1–4) that did not respond.

At block 530, the control logic 265 analyzes the call history of each user that does not respond to the alert. The call history may comprise information such as the last time the user checked the voice mail or the last time the user placed a call, or any other helpful information indicative of the user's use of the telephone 230 (1–4). At block 540, the control logic 265 approximates a number of occupants that may still be inside the premises. That is, the data based on the call history may be correlated with those users from whom no acknowledgement was received. For example, a user who fails to acknowledge the receipt of an alert may still be inside the premises 115, especially if the user utilized the phone just prior to the transmission of the alert. In this manner, a quick approximation of the number of occupants that potentially may be inside the premises 115 may prove to be very useful to the emergency personnel or other rescuers.

It should be noted that the application of the instant invention is not limited to delivering emergency messages, but rather the instant invention may be employed for delivering any messages to any number of users that have communication devices coupled to the telephony exchange system 110 (see FIG. 1).

A method and telephony exchange system 110 have thus been described to notify occupants of a building of a potential hazard. The described invention may save lives, or at least reduce the probability of occupants encountering serious injury at the premises. Occupants resident in a loud, crowded conference room or other public room may be quickly and efficiently informed of a possible emergency, even if the conventional emergency alarms are not audible in such areas. The described invention may serve as an independent, reliable backup emergency system, without the added expense of wiring the entire premises and purchasing another emergency system.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method, comprising:
   receiving an alert signal;
   identifying a plurality of users of a telephony exchange system;
   sending one or more indications to the identified plurality of users in response to receiving the alert signal;
   determining whether any of devices associated with the identified plurality of users are in use; and
   providing the one or more indications to one or more of the devices even though the one or more devices are in use.

2. The method of claim 1, wherein the telephony exchange system comprises a private telephony exchange system.

3. The method of claim 1, wherein the alert signal comprises an emergency signal.

4. The method of claim 3, wherein the emergency signal comprises a fire alarm system.

5. The method of claim 1, wherein sending the one or more indications comprises transmitting at least one of an audio, ringing, and visual signal to the identified plurality of users.

6. The method of claim 1, wherein sending the one or more indications comprises transmitting a message to devices selected from a group consisting of a telephone, facsimile device, computer, and computer network coupled to the telephony exchange system.

7. The method of claim 1, further comprising receiving an acknowledgement from at least one of the identified plurality of users in response to the one or more indications.

8. The method of claim 7, further comprising determining a number of the users not acknowledging the one or more indications.

9. The method of claim 8, further comprising determining an approximate number of users remaining inside a premises based on the number of the users not acknowledging.

10. The method of claim 1, wherein sending the one or more indications comprises sending one or more text messages for display by the devices.

11. The method of claim 1, further comprising interrupting the one or more devices that are in use prior to providing the one or more indications to the one or more devices.

12. A method, comprising:
receiving an emergency signal;
identifying at least two communication devices coupled to a telephony exchange system;
alerting the at least two identified communication devices in response to receiving the emergency signal;
receiving acknowledgement from at least one of the at least two communication devices in response to alerting the identified communication devices; and
calculating a number of users for which acknowledgment has not been received.

13. The method of claim 12, wherein identifying the at least two communication devices coupled to the telephony exchange system comprises identifying the at least two communication devices coupled to a private branch exchange system.

14. The method of claim 12, wherein alerting the at least two identified communication devices further comprises transmitting at least one of an audio, and ringing signal.

15. The method of claim 12, wherein the communication devices comprise telephones and wherein alerting the at least two of the identified telephones comprise:
determining if one of the identified telephones is in use;
interrupting the telephone use; and
transmitting the audio signal to the telephone.

16. The method of claim 12, further comprising approximating a number of users remaining inside a premises based on call history of the at least one of the communication devices for which the acknowledgement is not received.

17. A telephony exchange system, comprising:
an interface for receiving an alert signal; and
logic to:
identify a plurality of users of the telephony exchange system;
alert the identified plurality of users in response to receiving the alert signal;
receive acknowledgment from at least some of the users in response to the alert; and
calculate a number of users for which the acknowledgment has not been received.

18. The telephony exchange system of claim 17, wherein the telephony exchange system comprises a private telephony exchange system.

19. The telephony exchange system of claim 17, wherein the alert signal comprises an emergency signal.

20. The telephony exchange system of claim 17, wherein the logic to alert the identified plurality of users comprises logic to transmit an alert message to devices selected from a group consisting of a telephone, facsimile device, computer, and computer network coupled to the private telephony exchange system.

21. The telephony exchange system of claim 17, the logic further to determine an approximate number of users remaining inside a premises based on call history of the users for whom no acknowledgement has been received.

22. An article comprising one or more machine-readable storage media containing instructions that when executed cause a processor to:
receive an alert signal;
identify a plurality of users of a telephony exchange system;
communicate indications to the identified plurality of users of an emergency condition in response to receiving the alert signal;
determine whether any of devices associated with the identified plurality of users are in use; and
providing the indications to one or more of the devices even through the one or more devices are in use.

23. The article of claim 22, wherein the one or more machine-readable storage media contain instructions that when executed cause the processor to communicate at least one of an audio or a visual signal to the identified plurality of users.

24. The article of claim 22, wherein communicating the indications comprises communicating text messages for display by the devices.

25. The article of claim 22, wherein the instructions when executed cause the processor to interrupt the one or more devices that are in use prior to providing the indications to the one or more devices.

26. A system, comprising:
a plurality of communication devices;
a private telephony exchange system adapted to communicate with the plurality of communication devices, the private telephony exchange system adapted to:
receive an alert signal;
identify a plurality of users of the private telephony exchange system;
alert the identified plurality of users in response to receiving the alert signal;
determine whether any of devices associated with the identified plurality of users are in use: and
interrupt any device that is in use to provide an alert indication.

27. The system of claim 26, wherein the private telephony exchange system comprises a private branch exchange system.

28. The system of claim 26, wherein the alert signal comprises an emergency signal.

* * * * *